US009968214B2

United States Patent
Morin et al.

(10) Patent No.: US 9,968,214 B2
(45) Date of Patent: May 15, 2018

(54) CARBON FIBER HEATING ELEMENT

(71) Applicant: Carbon Fibers Heating Technologies, LLC, Forestville, CT (US)

(72) Inventors: Philip K Morin, Bristol, CT (US); Stanley G Tomalesky, Plantsville, CT (US)

(73) Assignee: CARBON FIBERS HEATINGTECHNOLOGIES, Forestville, CT (US)

( * ) Notice: Subject to any disclaimer, the term of this patent is extended or adjusted under 35 U.S.C. 154(b) by 8 days.

(21) Appl. No.: 14/195,199

(22) Filed: Mar. 3, 2014

(65) Prior Publication Data
US 2015/0245729 A1    Sep. 3, 2015

Related U.S. Application Data

(63) Continuation-in-part of application No. 12/761,614, filed on Apr. 16, 2010, now Pat. No. 8,274,019, and a continuation-in-part of application No. 12/878,083, filed on Sep. 9, 2010, now abandoned.

(51) Int. Cl.
*H05B 3/06* (2006.01)
*A47J 27/00* (2006.01)
*H05B 1/02* (2006.01)

(52) U.S. Cl.
CPC .......... *A47J 27/004* (2013.01); *H05B 1/0261* (2013.01); *Y02B 10/30* (2013.01)

(58) Field of Classification Search
CPC ........ A47J 27/004; A47J 27/02; A47J 27/022; H05B 1/0261; H05B 1/0266; H05B 1/0258; H05B 1/0263; H05B 3/30
See application file for complete search history.

(56) References Cited

U.S. PATENT DOCUMENTS

| | | | | |
|---|---|---|---|---|
| 7,662,002 B2* | 2/2010 | Johnston | ............ | H01R 13/5837 174/88 R |
| 2002/0117495 A1* | 8/2002 | Kochman | ................ | H05B 3/34 219/549 |
| 2008/0182461 A1* | 7/2008 | Johnston | ............ | H01R 13/5837 439/874 |
| 2009/0152276 A1* | 6/2009 | Groll | ...................... | A47J 36/04 220/573.4 |

* cited by examiner

Primary Examiner — Shawntina Fuqua
(74) Attorney, Agent, or Firm — Joseph Carvalko; Cara Morris

(57) ABSTRACT

This invention relates to a heating element that includes a carbon fiber tow having carbon threads enclosed between semi-rigid laminates, wherein each thread has an electrical resistance in the range of less than 0.25 to 0.50 ohm per centimeter, and wherein the threads are connected in electrical parallel and terminated into a copper braid, whereupon the application of a voltage generates heat for use in a wide range of appliances including a portable food warmer having a chafing pan and wherein the heating element is electrically connected to a power source controllable through one or more sensors for measuring the temperature of the chafing pan interior.

19 Claims, 3 Drawing Sheets

CARBON FIBER HEATING ELEMENT

CROSS-REFERENCE TO RELATED APPLICATIONS

This is a continuation-in-part of and claims the priority benefit under 35 U.S.C. 120 of U.S. patent application Ser. No. 12/878,083 entitled Portable Food Warmer With Carbon Fiber Heating Element, filed Sep. 9, 2010 and U.S. patent application Ser. No. 12/761,614 entitled A High Temperature Connector and Method for Manufacturing, filed Apr. 16, 2010, now U.S. Pat. No. 8,274,019, the entire disclosures of which are hereby incorporated by reference.

FIELD OF INVENTION

The present invention relates generally to a carbon fiber tow heater and the electrical connection thereto as well as the heater as applied to a cooking utensil.

BACKGROUND

The heating devices used in food cooking or food warming, especially in portable appliances or utensils, use a variety of technologies such as pre-heated ceramic discs and external electrical coil heaters that heat water, candles, and chemical burners. Each of these has problems in uniform heat distribution. Furthermore, in some applications, such as portable food warmers, these methods of maintaining heat present problems in transporting the containers in which the food is held. Carbon fiber tow heaters solve the problems by serving as integral parts of the containers in which food is held. In recognition of the aforementioned problems an apparatus directed to the safe, reliable cooking and maintenance of food at the proper temperatures used in both transportation and at locations for serving is needed.

Utilizing carbon fiber technologies generally presents a problem in terminating the fiber tow, so that it can be reliably used to conduct current. Prior art connectors used in the creation of heating element products often limit the maximum operating temperatures before degradation, reliability, product life cycle and serviceability. U.S. Pat. No. 7,662,002 (Johnston) discloses an assembly for connecting a tow of axially elongated carbon fibers with a plurality of discrete contact portions, referred to as a tow into a metal "U" shaped trough with knurled ridges. Manufacturing this type of connector requires pressing down a top male die with ridges to squeeze the carbon fiber layers and then uses ultrasonic welding to fix the fibers to contact points. A pneumatically activated carriage mechanism applies pressure to the preassembled parts. The '002 processes uses a 1000 watt ultrasonic welder producing a 20 kHz frequency and a long weld time of 600 milliseconds at 60 joules of energy. Once the fibers are welded to the connector they become an integral part of the fiber tow preventing a complete substitution of the entire assembly in the event there is a malfunction in the field. In addition these connectors have other problems that limit their usability. One problem arises because the ultrasonic energy causes the carbon fibers to vibrate and some portion of them migrate beyond the sides of the polyester film, causing shorts to ground when voltage is applied. This technique diminishes the reliability of the carbon tow device. Furthermore, the method of manufacture utilizing ultrasonic welding also slows down the manufacturing of the assembly. Additionally ultrasonic welding of carbon fibers to metal is unreliable when the connector temperature exceeds a temperature of 400° F. For flat heating elements utilizing carbon fiber tows, contained in a polyester sheath, the temperatures cannot exceed a temperature of 350° F. before the connector itself and the polyester suffer permanent damage. As will be described below, a novel sheathing material utilizing in one instance a copper foil in combination with a copper braid to attached to the carbon fiber tow, allows the temperature of the carbon fiber tow to exceed a temperature of 700° F. and therefore any connector utilizing ultrasonic welding is unsuitable. In an alternate connecting device a metal clam shell connector as describe in the related U.S. Pat. No. 8,274,019 for a High temperature connector and method for manufacturing does allow the temperature of the carbon fiber tow to exceed a temperature of 700° F.

SUMMARY OF THE INVENTION

The present invention relates to a flat, rectangular heating element comprising a carbon fiber tow consisting of carbon fiber threads numbering substantially in the range of 3,000 to 50,000 carbon fibers per tow, said tow enclosed between laminates selected from one of metals, such as aluminum, stainless steel, or copper, glass, such as glass ceramic in the Li2O×Al2O3×nSiO2-System (LAS-System), glass-epoxy, ceramic, thermoform plastic or thermoset plastic, the carbon fiber threads, having a cross-sectional diameter substantially in the range of 5 to 10 microns, placed longitudinally within the laminates and substantially parallel to one another, and having an electrical resistance in the range of less than 0.25 to 0.50 ohm per centimeter, connected in electrical parallel to a copper braid, to generate heat upon the application of a voltage.

The present invention also relates to a portable food heating system comprising a cavity having a chafing pan, and having a heating element installed therein, the element including a carbon fiber tow having threads numbering substantially in the range of 12,000 carbon fibers per tow, said tow enclosed in a sheathing material, in the form of two laminates manufactured from one of metals, glass or glass-ceramics, G-10 glass-epoxy, ceramic material, thermoform plastic or thermoset plastic, the threads having a cross-sectional diameter substantially in the range of 5 to 10 microns, substantially parallel to one another, and having an electrical resistance in the range of less than 0.25 to 0.50 ohm per centimeter, connected in electrical parallel to a copper braid, to generate heat upon the application of a voltages.

The present invention also relates to a heating system including: a controller that allows the heating element to maintain a set temperature for the heating of food; where the controller uses one or more sensors to measure the temperature of one of (a) the internal space, (b) the walls embedding a plurality of carbon fiber tow heating elements and (c) the temperature of the carbon fiber tow.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts, and wherein.

DESCRIPTION OF THE INVENTION

It is to be understood that the figures and descriptions of the present invention have been simplified to illustrate elements that are relevant for a clear understanding, while eliminating, for the purpose of clarity, many other elements found in food utensils and methods of using the same. Those of ordinary skill in the art may recognize that other elements and/or steps may be desirable in implementing the present invention. However, because such elements and steps are well known in the art, and because they do not facilitate a better understanding of the present invention, a discussion of such elements and steps is not provided herein.

FIG. 1a and FIG. 1b show a preferred embodiment of the invention, having a carbon fiber tow 40, enclosed between a sheathing material described as cover 10a and 10b, and arranged as series of thousands of individual substantially parallel carbon fiber threads, wherein each thread has a cross-sectional diameter in the 5-10 micron (µm) range. Carbon fibers typically are manufactured in bundles of 3,000, 6,000, 12,000, 24,000 and 50,000 fiber threads per bundle. Bundles are typically hundreds of feet long, which in the heater application disclosed herein are cut to size before the individual fibers are randomly laid, longitudinally within the laminates and substantially parallel to one another. The individual fibers have high electrical resistance, so that many fibers must be configured as an electrically paralleled circuit, to achieve the desired resistance for practical current conduction and heater voltages.

Figure 1:
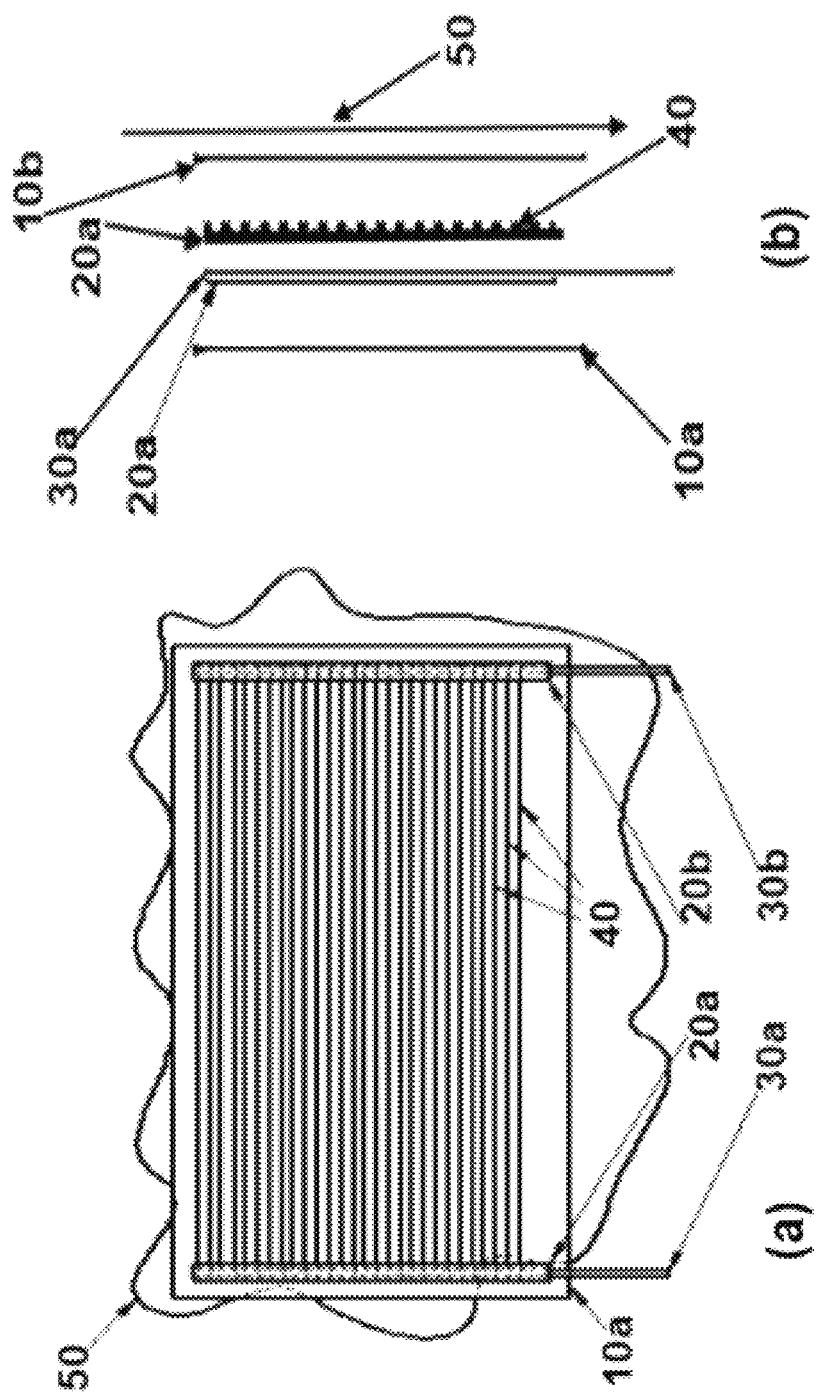
FIG. 1a is a front plan view of a carbon tow heating element according to an embodiment of the present invention.
FIG. 1b is a side plan view of a carbon tow heating element according to an embodiment of the present invention.

The carbon fiber tow are disposed within a single bundle having a substantially flat, generally oval or elliptical cross section throughout its entire length which are disposed in a generally longitudinal, side-by-side parallel relation to each other (see FIG. 1, 40.) Additionally, the high resistance carbon fibers allows the heater design to be "tuned" to the application in terms of shape, operating voltage, and power output, depending on such parameters as the number of fibers used, the length and the diameter. The tows used in appliance applications, such as a chafing dish, contain from about 3,000 to about 12,000 generally cylindrical carbon filaments or fiber strands each having a diameter ranging from 5-10 µm and an electrical resistant measured in the ambient temperature range of 75° F. of substantially 0.795 ohms per inch. However, electrical resistances that may be greater or lesser depending on the particular carbon fiber thread diameter and length may be accommodated in the heater described herein.

Many carbon fiber threads incorporated into a bundle yield an extremely high surface area. By way of example and not limitation, each individual fiber thread comprises a cylinder having a surface area 2 πrL, where r, the radius, typically 10 µm, and L, the length of the fiber, is typically 12 inches. Given these dimensions, the area for a 10,000 fibers tow, yields a surface area, 12.36 square inches. Such a high surface area facilitates high heat transfer rates at low differential temperatures (i.e. the heating element need be heated to just over the target temperature to transfer heat as opposed to a single wire with much less surface area which must be run at a higher temperature to transfer the same heat.) Lower element temperature allows for the use of a broader range of insulating materials to reduce material fatigue during heat-cool cycles and is generally safer to operate. Increasing the number of fibers between the copper conductors copper wire braid 30a, 30b increases the total current at a given voltage, and therefore, increasing the amount of heat generated.

The carbon fiber heating element ideally consists of carbon fibers, equally spaced and extending between the copper conductors. Equally spaced carbon fibers is not practicably achievable, however an approximation is realizable by spreading the fibers laterally over the surface area of the laminate 10a, FIG. 1, e.g., G-10 epoxy material base, or one of the metals, aluminum, stainless steel, or copper ranging in thickness from 0.002 inches to 0.150 inches or glass, such as glass ceramic in the $Li_2O \times Al_2O_3 \times nSiO_2$-System (LAS-System), ceramic, thermoform plastic or thermoset plastic.

Glass-ceramic from the LAS-System is a mechanically strong material and can sustain repeated and quick temperature changes and finds applications in glass-ceramic stovetops. The LAS-system mainly refers to a mix of lithium-, silicon-, and aluminum-oxides with additional components e.g., glass-phase forming agents such as $Na_2O$, $K_2O$ and $CaO$ and refining agents. As nucleation agents most commonly zirconium (IV)-oxide in combination with titanium (IV)-oxide is used.

As indicated in one embodiment the covers 10a, 10b are made of a G10 glass-epoxy laminate known for its extremely high strength and high dimensional stability over temperature, NEMA Grade G-10 laminate material is a continuous filament woven fiberglass sheet bonded with epoxy resin. The material has the ability to maintain mechanical, electrical, and physical properties at elevated temperatures to 130° C. NEMA G-10 is a non-brominated, non-flame retardant grade of glass epoxy laminate. Other insulating materials such as G3 (phenolic-glass), PEEK, PTFE, as well as PVC, HDPE, and virtually any plastic that can be molded to contact the carbon fibers contained within the upper and lower protective laminate sheets, provided it meets or exceeds the temperature at which the material deforms, or the heat transfer and loading requirements and tensile strengths required of the particular application to which the element is being applied.

G-10 resin, as used in the present invention is manufactured as a solid, imbedded in glass fiber cloth, which melts then re-solidifies at the cure temperature. After the powder is applied (usually by electrostatic deposition) the coated item is heated to melt and cure the powder. The heat is typically supplied by an oven or a heat gun. G-10 cures at approximately 345+/−5° F. and is held at that cure temperature for nominally 2.0 hours. Since the two G-10 laminates contain the carbon fibers, it has been found that the G-10 can be cured by the application of electrical power to the carbon fibers and heat applied as a constant 345+/−5° F. As such, the system of laminated G-10 having an encapsulated carbon fiber therein acts as a self-curing system.

Since handling individual 5-10 µm fibers is often a costly manufacturing endeavor, in one embodiment, the bundles are not winnowed down to a collection of individual fibers size, but handled as larger bundles and spread out over the surface area of the laminate. No binding devices are used so the individual bundles spread laterally across the laminate 10a material and are held firmly in place when the two laminates covers 10a, 10b, are compressed. This also has the benefit of reducing the overall thickness of the heater and more evenly distributing the heat energy, while increasing the flexibility and "conformability" of the heater.

The carbon fibers have been determined to be substantially stronger than metal, where tensile strength exceeds the latter by a factor of four (4). Furthermore, carbon fiber exhibits greater flexibility (i.e., favorable tensile/bending strain qualities) than comparably dimensioned wire, thus allowing the fibers to be molded to conform and to achieve closer physical contact with the target surface (FIG. 1, 50), thus maximizing low temperature heat transfer. The carbon fiber composite may also contribute to the strength (or provide the strength) to the finished product (e.g. in applications such as chafing pans, wind turbine blades or heated fan blades for hot air systems, heated walkway/floor tiles, heated blankets for instrument storage boxes, mold heaters, domestic water heaters etc.). For example, if material such as a low-thermal-expansion borosilicate tempered glass is used as the top cover 10b, the heater can serve as the surface upon which food is placed to be heated.

With further reference to FIG. 1, a pair of copper foils 20a and 20b, serve to terminate each of the ends of the carbon fiber tow, and provide for an electrical attachment to copper braids 30a and 30b, respectively, to an alternating current or a direct current power source. The copper wire braid 30a, 30b is used to further reduce contact resistance and provide a more reliable electrical connection between a power source and the heating element 40. Virtually any stranded metallic wire can be used to replace the copper. It should be noted that utilizing copper foil and copper braids reduce manufacturing costs, as compared to wire heater processes, since the elements may be assembled using a continuous automated web process. Electrical terminations internal to the element are achieved using adhesives and do not require crimping, soldering or other similar mechanical processes. (Material costs are comparable to metallic heating conductors.)

The metallic foil members 20a, 20b provides a low resistance electrical connection to the carbon fiber 40, such that an alternating or direct current may be applied. The carbon fiber tow is sandwiched between the two foils members utilizing a conductive adhesive to provide minimum electrical contact resistance. It has been found that a copper foil, serves to fulfill the requirements for many applications, however, other metallic foils having the electrical and thermal requirements may be used as well. The protective sheets are composed of any suitable material that provides a semi-rigid support, an efficient heat transfer and a mechanical surface contact with the item being heated.

The carbon fiber tow 40 construction technique allows the use of smaller tow (fewer fibers per bundle) down to individual carbon fibers. The advantage of smaller tow is more uniform heat distribution, increased reliability, thinner construction and more flexibility in designing heating elements to meet specific voltage and geometric requirements. In another embodiment, other types of carbon-based materials, such as carbon nanotube (CNT) and graphene, both carbon conductors of heat and electricity, may optionally be used as the material for the carbon fiber disclosed herein. By way of example and not limitation, in one embodiment of the invention, a CNT fiber is utilized, which behaves similar to both metal wires and strong carbon fibers to supply heat. CNT fibers have a thermal conductivity approaching that of the high quality graphite fibers with at least 10 times greater electrical conductivity. Additionally CNT overcomes the brittleness of graphite yet retains the flexible and tough quality of textile threads. In one embodiment of the invention the construction method/design also allow the use of CNT fibers, which also allow for the elimination of the need for the copper wires in heaters.

Figure 2:
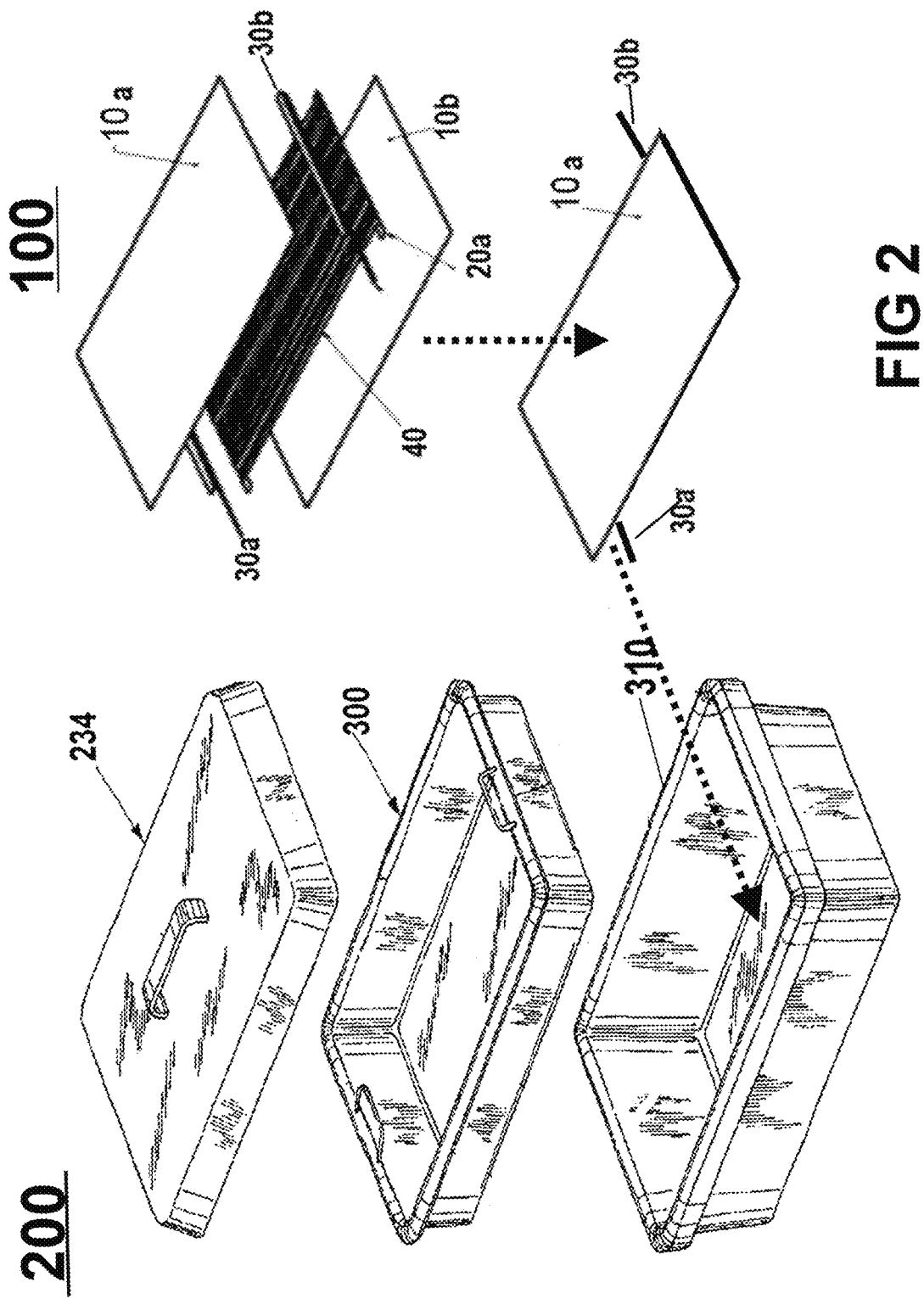
FIG. 2 is a perspective view of a carbon tow heating element and cooking utensil according to an embodiment of the present invention.

FIG. 2, assembly 100 shows one embodiment of the substantially flat, rectangular, carbon tow array heating element 40 fixed in place between an upper protective sheet 10a and lower protective sheet 10b. FIG. 2 also shows an embodiment of the present invention installed in a portable food utensil known as a chafing pan 300, having a cover 234, and a heating pan 310 (shown as assembly 200.) Assembly 100 fits into assembly 200, pan 310, so as to heat pan 300.

In one non limiting embodiment, the heating assembly 100 is "bonded" to the surface of pan 310, but in other uses the heater will be as affixed to other parts a device, where the application of heat is required: e.g., the bottom plate of a hot plate, chafing dish pan, frying pan, cook pot, pipe, or the surface of a wind turbine blade or airfoil, or a free standing heater subjected to convection for space heaters, and heated floor mats. The advantage in this invention is that the heater provides very efficient (low thermal resistance) heat transfer (lower delta temperature per BTU) than is possible with other electrical wire-based heaters.

Figure 3:
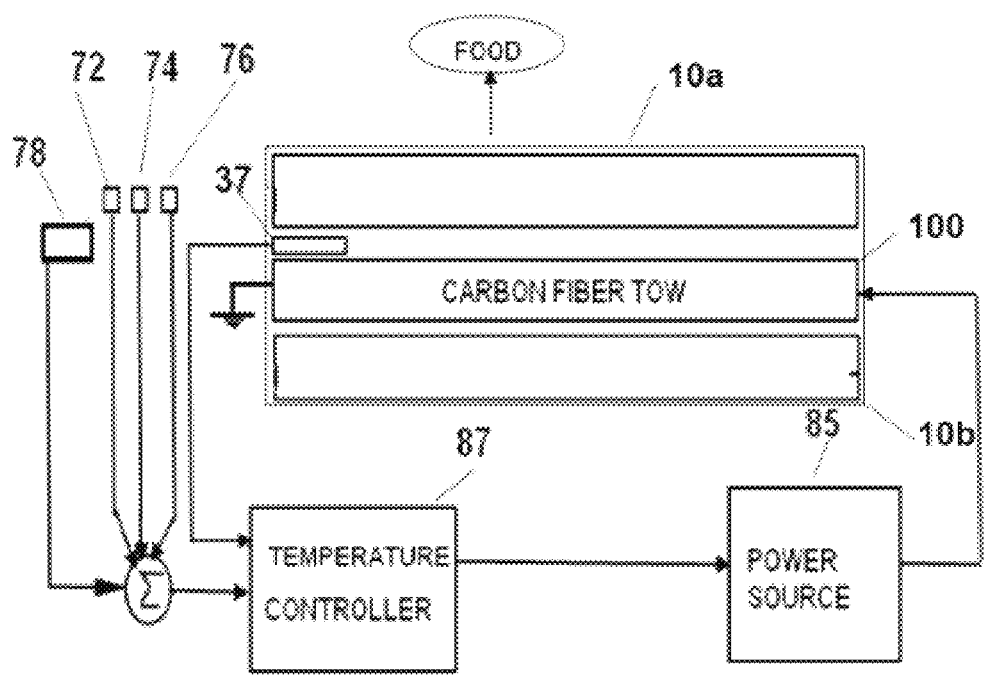
FIG. 3 illustrates a diagram for a controller, heater, sensor and power source for regulating the heat in a portable food apparatus in accordance with an embodiment of the present invention.

In FIG. 3, the heater assembly 100 temperature may be controlled through a heater controller 87, a manually adjustable temperature setting device, such as, by way of example and not limitation potentiometer 78, and temperature sensors, by way of example and not limitation, a sensor 72 for measuring the temperature in the space of the span, a sensor 76 for measuring the temperature on the internal surface of the pans and a connection for a sensor 74 that can be inserted into the food itself to measure the temperature of the food. In one non limiting embodiment the maximum temperature is below 250° F. In other embodiments a control element acts as a heat limiter to keep heat at some prescribed minimum such as below 200° F. degrees to keep food from drying up. For example, in such an embodiment, a further feature incorporates a heat limiter 38 that shuts down or reduces power to the heater when the temperature reaches at 170° F. degrees and re-powers when the food temperature falls below 155° F. In yet another embodiment a sensor 37 measures the temperature of the connector that attaches to the carbon fiber tow to the power source.

Upon installation of the heater 34, controller 87 and heater control elements, and ancillary connections such as connector 74, and power source 85 connector 31, the lower part 43 and the upper part 42 seal in any suitable manner known to those of ordinary skill in mechanical fabrication of metallic and compositional materials.

The pan 300 controller 87 computes conditions related to the desired temperature in the internal space or well of the pan 300, which may include the external and internal pan temperature or the temperature of the food. These temperatures in turn are used to control the electrical power to the heater 34 in turn regulating the temperature in the well of the pan 300. The regulation of the temperature in the well of the pan or the food may require taking into account heat loss through the walls of the pan 300 in a computation for regulating the temperature in the pan 300 or the temperature of the food. The electrical circuit will be more fully described with reference to FIG. 3.

The controller 87 comprises a processor (not shown), such as one or more conventional microprocessors and one or more supplementary co-processors such as math co-processors. The processor is in communication with a communication port through which the processor communicates with other devices such as sensors, 72, 74, 76 and temperature setting device 78.

In one embodiment, the present invention also includes computer software embodied on a computer readable medium for controlling the controller 87 including code for controlling the power source 85 dependent on the temperature in the well of the pan 300 or the food; receiving input data from temperature setting device 78 on the desired temperature of the pan 300 or the food; receiving data from sensors 72, 74, 76, 31 and 37, on the temperature conditions of the well of the pan and the food; controlling the power supply output heating of the pan 300 or food to keep the food suitably warm.

In yet another embodiment a computer software embodied on a computer readable medium for controlling the temperature of the portable food utensil 200 includes code for: receiving one or more sensor data from sensors 72, 74, 76, 31 and 37 on the temperature condition of the pan, such as the surface of the outer wall 42 of the heating pan 300 or the food; controlling a power source 85 supplying power to carbon fiber tow 30*a* heater 34 dependent on the sensor data; receiving sensor data from temperature setting device 78 on the desired temperature inside the pan 300; controlling the power source 85 supplying power to the carbon fiber tow heater 100 dependent on sensor data to maintain a desirable temperature of the food situated in the utensil 200.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A portable food heating system comprising a heating element having a carbon tow having fiber threads with a cross-sectional diameter substantially in the range of 5 to 10 microns, the number of fibers and the length of the fibers dependent on a desired thermal power output of the tow, said tow placed longitudinally between a pair of compressed glass-epoxy laminates, having a continuous woven filament fiberglass sheet and an epoxy resin; a pair of copper braids attached to opposite ends of the tow, a first power source for providing a current to the copper braids for generating heat at a cure temperature for melting the resin that bonds the fiber thread to the fiber cloth, and solidifies the laminates; a chafing pan installed into a cavity having insulation material, and wherein the heating element is affixed to one or more of surfaces of said pan; a second power source connected to the copper braids, said braids connected to a temperature controller that controls the heat generated by the heating element.

2. The portable food apparatus of claim 1, wherein the controller maintains a limited range of temperature for the heating of food.

3. The portable food apparatus of claim 1, including a sensor to measure the temperature of one of (a) an internal pan space, (b) the food, or (c) the walls embedding a plurality of carbon fiber tow heating elements.

4. The portable food apparatus of claim 1, wherein the controller utilizes data representing a setting of the temperature desired in one of (a) the a pan or (b) the food.

5. The portable food apparatus of claim 1, including a sensor to measure the temperature of the carbon fiber tow.

6. The portable food apparatus of claim 1, including a sensor to measure the temperature of one of the food or the walls embedding a plurality of carbon fiber tow heating elements.

7. The portable food apparatus of claim 1, wherein the heating element is in direct contact with the external surface of the a pan.

8. The portable food apparatus of claim 1, wherein the laminate is comprised of a material that forms the heating surface of a pan included in the portable food apparatus.

9. The portable food apparatus of claim 1, wherein the material that forms the heating surface of the pan is glass.

10. The portable food apparatus of claim 1, wherein the laminates are selected from one of metals, glass, glass-epoxy, ceramic, thermoform plastic or thermoset plastic.

11. The portable food apparatus of claim 10, wherein the metal is selected from one of aluminum, stainless steel, or copper.

12. The portable food apparatus of claim 10, wherein the glass is selected from one of ceramic in the $Li_2O \times Al_2O_3 \times nSiO_2$-System.

13. A portable food heating system comprising a heating element having a carbon tow having fiber threads with a cross-sectional diameter substantially in the range of 5 to 10 microns, the number of fibers and the length of the fibers dependent on a desired thermal power output of the tow, said tow placed longitudinally between a pair of semi-rigid laminates, the laminates selected from one of a metal, glass-epoxy, ceramic, thermoform plastic or thermoset plastic; a pair of copper braids attached to opposite ends of the tow; a chafing pan installed into a cavity having insulation material, and wherein the heating element is affixed to one or more of surfaces of said pan, a power source connected to the copper braids, said braids connected to a temperature controller that controls the heat generated by the heating element.

14. A process for heating food comprising the steps of: constructing a heating element by spreading laterally carbon fiber threads over a surface area of one of a pair of laminates, applying a compression force for holding the fibers in place between the pair of laminates, tuning a thermal power output of the fibers by selecting an operating voltage dependent on the number of fibers, the length, shape and the diameter of said fibers used in the tow, selecting the laminates from a continuous woven filament fiberglass sheet, applying an epoxy resin, attaching a pair of copper braids to opposite ends of the tow, applying a voltage to the copper braids for generating heat at a cure temperature for melting the resin that bonds the fiber thread to the fiber cloth, and solidifies the laminates; installing a chafing into a cavity having insulation material, and affixing the heating element to one or more of surfaces of said pan, applying a second voltage to the copper braids to heat the heating element.

15. The process of claim 10, including employing a sensor to measure the temperature of one of (a) the pan, (b) the food, or (c) the one or more of surfaces of said pan.

16. The process of claim 10, including employing a controller for setting of the temperature desired in one of (a) the pan or (b) the food.

17. The process of claim 10, including employing a sensor to measure the temperature of the carbon fiber tow.

18. The process of claim 10, including employing a sensor to measure the temperature of one of the food or the walls embedding a plurality of carbon fiber tow heating elements.

19. The process of claim 10, wherein the material that forms the heating surface of the pan is glass.

\* \* \* \* \*